US007921212B2

(12) United States Patent
Li et al.

(10) Patent No.: US 7,921,212 B2
(45) Date of Patent: Apr. 5, 2011

(54) METHODS AND APPARATUS TO ALLOCATE BANDWIDTH BETWEEN VIDEO AND NON-VIDEO SERVICES IN ACCESS NETWORKS

(75) Inventors: Jian Li, San Ramon, CA (US); Raghvendra Savoor, Walnut Creek, CA (US); Zhi Li, Martinez, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 193 days.

(21) Appl. No.: 12/251,130

(22) Filed: Oct. 14, 2008

(65) Prior Publication Data

US 2010/0094989 A1    Apr. 15, 2010

(51) Int. Cl.
*G06F 15/173*    (2006.01)
(52) U.S. Cl. .................. 709/226; 709/223; 709/224
(58) Field of Classification Search .............. 709/226, 709/223, 224, 232, 233; 370/468, 230, 389, 370/395.31; 725/116, 86; 375/240.01; 708/103, 708/104
See application file for complete search history.

(56) References Cited

U.S. PATENT DOCUMENTS

| | | | |
|---|---|---|---|
| 6,307,839 B1 | 10/2001 | Gerszberg et al. | |
| 6,452,923 B1 | 9/2002 | Gerszberg et al. | |
| 6,754,230 B2 | 6/2004 | Purpura et al. | |
| 6,931,011 B2 | 8/2005 | Giacopelli et al. | |
| 7,039,715 B2 | 5/2006 | England et al. | |
| 7,151,781 B2 | 12/2006 | MeLampy et al. | |
| 7,257,640 B1 | 8/2007 | Callocchia et al. | |
| 2004/0228291 A1 | 11/2004 | Huslak et al. | |
| 2005/0078690 A1 | 4/2005 | DeLangis | |
| 2005/0286559 A1 | 12/2005 | Miernik et al. | |
| 2006/0195881 A1* | 8/2006 | Segev et al. .................... | 725/116 |
| 2006/0222008 A1 | 10/2006 | Aaron et al. | |
| 2006/0251116 A1 | 11/2006 | Bedingfield et al. | |
| 2007/0070890 A1 | 3/2007 | Rojahn | |
| 2007/0098015 A1 | 5/2007 | Eijsberg | |
| 2007/0177626 A1 | 8/2007 | Kotelba | |
| 2007/0237176 A1 | 10/2007 | Bartlett et al. | |
| 2007/0242655 A1 | 10/2007 | Li et al. | |
| 2008/0056240 A1 | 3/2008 | Ellis et al. | |
| 2008/0075116 A1 | 3/2008 | Holierhoek et al. | |
| 2008/0101405 A1* | 5/2008 | Wirick et al. ................. | 370/468 |
| 2008/0285569 A1* | 11/2008 | Stademann et al. ..... | 370/395.31 |
| 2009/0060028 A1* | 3/2009 | Liu et al. .................. | 375/240.01 |
| 2009/0080328 A1* | 3/2009 | Hu et al. ....................... | 370/230 |
| 2009/0147779 A1* | 6/2009 | Foti .............................. | 370/389 |
| 2009/0150943 A1* | 6/2009 | Vasudevan et al. ............. | 725/86 |

* cited by examiner

*Primary Examiner* — Le Luu
(74) *Attorney, Agent, or Firm* — Hanley, Flight & Zimmerman, LLC (57) ABSTRACT

Example methods and apparatus to allocate bandwidth between video and non-video services in access networks are disclosed. An example system comprises a customer-premises device, a digital subscriber line access multiplexer (DSLAM) to transmit to the customer-premises device a signal having a non-video portion and a video portion, a usage monitor at the customer-premises device to monitor a usage of the video portion and to send a parameter representative of the usage of the video portion to the DSLAM, and a policy manager at the DSLAM to adjust at the DSLAM a bandwidth allocation between the video portion and the non-video portion based on the parameter.

23 Claims, 4 Drawing Sheets

METHODS AND APPARATUS TO ALLOCATE BANDWIDTH BETWEEN VIDEO AND NON-VIDEO SERVICES IN ACCESS NETWORKS

FIELD OF THE DISCLOSURE

This disclosure relates generally to access networks and, more particularly, to methods and apparatus to allocate bandwidth between video and non-video services in access networks.

BACKGROUND

Communication systems using digital subscriber line (DSL) technologies are commonly utilized to provide voice, video, video on demand (VoD), and/or Internet-based services to customer-premises. DSL technologies enable service providers to utilize telephone lines to connect customers to, for example, a high data-rate broadband Internet network, a broadband service and/or broadband content. An example telephone line uses twisted-pair copper wire to provide Plain Old Telephone System (POTS) services. A communication company and/or service provider may utilize a plurality of DSL modems implemented by a DSL Access Multiplexer (DSLAM) at a central office (CO) or serving area interface (SAI) to provide DSL communication services to a plurality of DSL modems located at respective customer premises. In general, a DSLAM receives broadband service content from, for example, a backbone server and a CO DSL modem of the DSLAM forms from the content a downstream DSL signal to be transmitted to a customer-premises DSL modem. Likewise, the CO DSL modem receives an upstream DSL signal from the customer-premises DSL modem and the DSLAM provides the data transported in the upstream DSL signal to the backbone server.

DETAILED DESCRIPTION

Methods and apparatus to allocate bandwidth between video and non-video services in access networks are disclosed. A disclosed example system includes a customer-premises device, a digital subscriber line (DSL) access multiplexer (DSLAM) to transmit to the customer-premises device a signal having a non-video portion and a video portion, a usage monitor at the customer-premises device to monitor a usage of the video portion and to send a parameter representative of the usage of the video portion to the DSLAM, and a policy manager at the DSLAM to adjust at the DSLAM a bandwidth allocation between the video portion and the non-video portion based on the parameter.

A disclosed example customer-premises apparatus includes a DSL modem to receive a signal having a non-video portion and a video portion, and a usage monitor to determine a parameter representative of usage of the video portion and to provide the parameter to a DSLAM, wherein the DSLAM is to apply a bandwidth limit to the non-video portion of the signal at the DSLAM based on the parameter.

A disclosed example method includes receiving a DSL signal having a non-video portion and a video portion, determining a parameter representative of usage of the video portion, and sending the parameter to a DSLAM, wherein the DSLAM is to adjust a bandwidth allocation between the video portion and the non-video portion of the signal at the DSLAM based on the parameter.

Another disclosed example method includes receiving from a residential gateway a parameter representative of video usage associated with the residential gateway, adjusting an egress rate of a non-video queue associated with the residential gateway, and generating a signal associated with the residential gateway based on a first output of a video queue and based on a second output of the non-video queue.

Another disclosed example apparatus includes a first queue associated with video data, a second queue associated with non-video data for a residential gateway, a policy manager to receive from the residential gateway a parameter representative of usage of a video portion of a digital subscriber line signal and to adjust an egress rate of the second queue based on the received parameter, and a signal generator to form a signal based on a first output of the first queue and a second output of the second queue.

In the interest of brevity and clarity, throughout the following disclosure, references will be made to an example access network 100 of FIG. 1 and/or the use of Gigabit Ethernet and VDSL technologies in the example access network 100. However, the methods and apparatus described herein to allocate bandwidth between video and non-video services in access networks are applicable to other types of access systems and/or networks constructed using, for example, other network technologies, network topologies, network protocols, communication technologies, and/or communication devices. Other example systems include, but are not limited to, those associated with public switched telephone network (PSTN) systems, public land mobile network (PLMN) systems (e.g., cellular), wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, passive optical network (PON) systems, and/or any combination and/or hybrid of these devices, systems and/or networks. Moreover, while the examples illustrated herein are described with reference to communication service data transported to a customer premises, the example methods and apparatus described herein to allocate bandwidth between video and non-video services are equally applicable to communication service data originating from and/or being transported from a customer premises.

Figure 1:
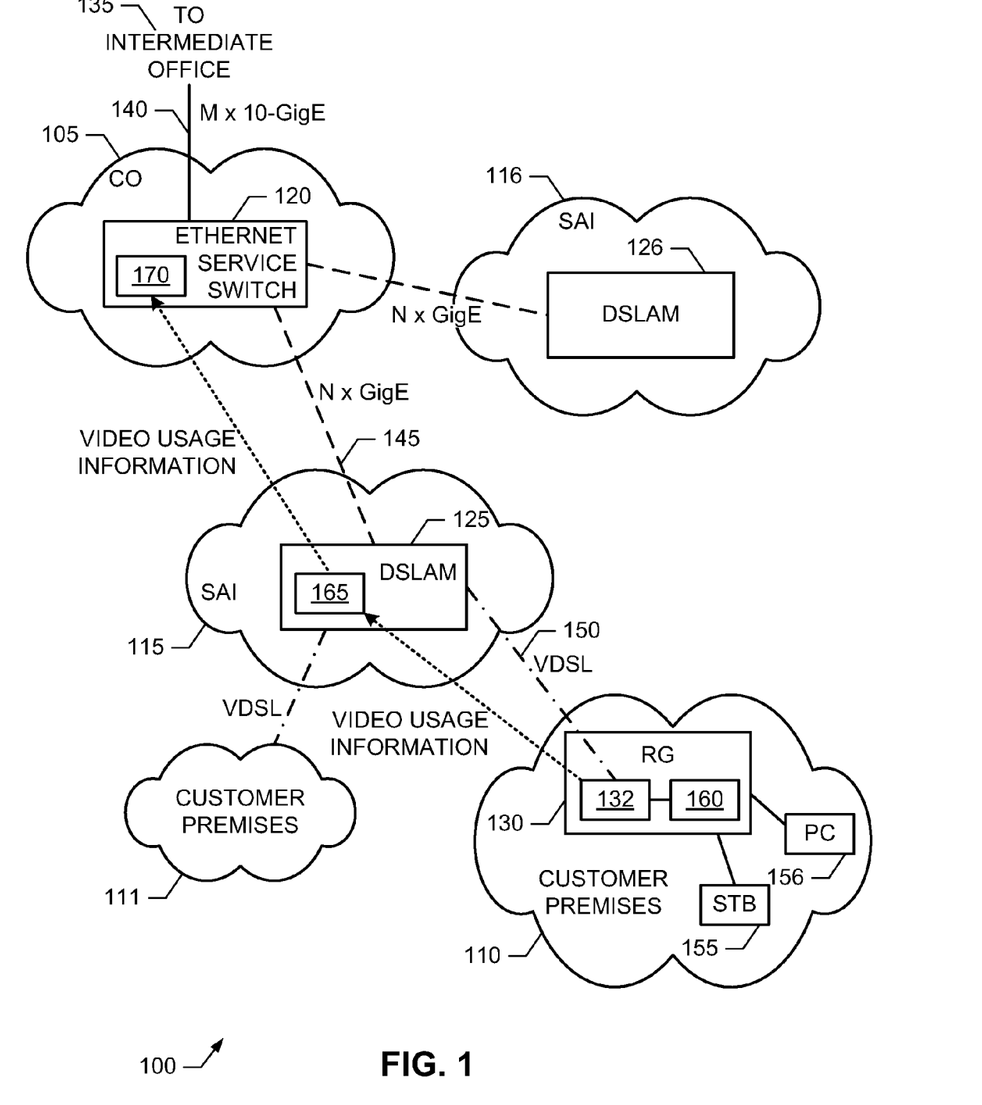
FIG. 1 is a schematic illustration of an example access network constructed in accordance with the teachings of this disclosure.

FIG. 1 illustrates the example access network 100 in which a central office (CO) 105 provides communication services to one or more customer premises, two of which are designated at reference numerals 110 and 111. Example services include, but are not limited to, telephone services, Internet-based services, data services, messaging services, instant messaging services, electronic mail (email) services, chat services, video services, video on demand (VoD) services, audio services, and/or gaming services. The example CO 105 of FIG. 1 provides the services to the example customer premises 110 and 111 via interposed serving area interfaces (SAIs), two of which are designated at reference numerals 115 and 116. For instance, the example CO 105 provides one or more communication services to the example customer premises 110 via the example SAI 115.

To provide DSL communication services to the customer premises 110 and 111, the example CO 105 of FIG. 1 includes an Ethernet service switch 120, the example SAIs 115 and 116 each include one or more DSL access multiplexers (DSLAMs) (two of which are designated at reference numerals 125 and 126), and the example customer premises 110 and 111 each include a respective customer-premises equipment (CPE) device such as a residential gateway (RG), one of which is designated at reference numeral 130. The example DSLAMs 125 and 126 of FIG. 1 include and/or implement one or more CO DSL modems (not shown) for respective ones of customer-premises locations. The example CPE device 130 likewise includes and/or implements a CPE DSL modem 132. The example DSLAMs 125 and 126, the CO DSL modems within the DSLAMs 125 and 126, and the example CPE DSL modem 132 of FIG. 1 are implemented in accordance with the International Telecommunications Union—Telecommunications Sector (ITU-T) G.993.x family of recommendations for very high-speed DSL (VDSL). However, the DSLAMs 125 and 126, the CO DSL modems within the DSLAMs 125 and 126, and the CPE DSL modem 132 could be implemented in accordance with any other past, present and/or future communication standard(s), recommendation(s) and/or specification(s) related to the transmission of communication services via telephone lines.

The example Ethernet service switch 120 of FIG. 1 is communicatively coupled to an Intermediate Office 135 via any one or more 10 Gigabit per second Ethernet (commonly referred to as 10-GigE) communication paths 140. The example 10-GigE communication paths 140 of FIG. 1 carry voice, video and/or Internet-based data for the plurality of subscribers served by the example Ethernet service switch 120. While 10-GigE communication paths 140 are utilized in the illustrated example of FIG. 1, any number of additional and/or alternative type(s) of communication paths may be used to communicatively couple the CO 105 to the Intermediate Office 135.

The example Ethernet service switch 120 of FIG. 1 separates data received from the Intermediate Office 135 via the 10-GigE communication paths 140 into a plurality of virtual local area network (VLAN) streams. In the illustrated example of FIG. 1, there is a VLAN stream for each of the customer premises 110 and 111 served by the Ethernet switch 120. In addition to the per customer premises VLAN streams, there are shared VLAN streams to carry management and multicast data such as multicast video. Likewise, the example Ethernet service switch 120 of FIG. 1 combines data received from the customer premises 110 and 110 via the plurality of VLAN streams onto the 10-GigE communication paths 140 for transport to the Intermediate Office 135.

The example Ethernet service switch 120 of FIG. 1 is communicatively coupled to each of the SAIs 115 and 116 via respective sets of Gigabit per second Ethernet (commonly referred to as GigE) communication paths, one of which is designated at reference numeral 145. The example GigE communication path 145 of FIG. 1 carries the VLAN streams associated with the customer premises 110 and 111 served by the SAI 115. The GigE communication path 145 also carries the management and multicast data VLAN streams utilized by and/or at the SAI 115. While GigE communication paths are utilized in the illustrated example of FIG. 1 to couple the Ethernet service switch 120 to the SAIs 115 and 116, any number of additional and/or alternative type(s) of communication paths may be used.

In the illustrated example of FIG. 1, the DSLAMs 125 and 126 provide DSL services to customer-premises 110 and 111 via respective subscriber lines, one of which is designated at reference numeral 150. Subscriber lines are sometimes also referred to in the industry as "wire-pairs", "subscriber loops" and/or "loops." A subscriber line used to provide a communication service to a customer-premises location 110 and 111 may include and/or be constructed from one or more segments of twisted-pair telephone wire (e.g., a combination of a feeder one (F1) cable, a distribution cable, a drop cable, and/or customer-premises wiring), terminals and/or wiring distributions points. Such segments of twisted-pair telephone wire may be spliced and/or connected end-to-end, and/or may be connected at only one end, thereby creating one or more bridged-taps. Regardless of the number, type(s), gauge(s) and/or topology of twisted-pair telephone wires used to construct the example subscriber line 150, it will be referred to herein in the singular form, but it will be understood that the term "subscriber line" may refer to one or more twisted-pair telephone wire segments and may include one or more bridged taps.

The data rate at which communication services can be delivered to the customer premises 110 via the subscriber line 150 are limited by the terms of a service agreement and/or characteristics of the subscriber line 150. Example subscriber line characteristics include, but are not limited to, length of the cable segment(s) of the subscriber line 150, the gauge(s) of the cable segment(s) of the subscriber line 150, and the presence or absence of bridge taps. Because the data rate at which data can be conveyed via the subscriber line 150 is limited, the example access network 100 of FIG. 1 allocates portions of the achievable data rate among the communication services provided via the subscriber line 150. Such allocations may be used, for example, to ensure that the quality of video services delivered via the subscriber line 150 is substantially constant. For example, the allocations may be used to ensure that the use of non-video services does not cause interruptions in the display of a video program. Traditionally, access networks have implemented fixed bandwidth allocations. For example, a traditional access network may reserve approximately 21 Million bits per second (Mbps) of a 25 Mbps capable subscriber line for video services with the remaining bandwidth available for use by non-video services. However, such traditional allocations restrict the data rate available for non-video services even when video and/or VoD services are not currently utilizing all of the bandwidth reserved for video services.

In contrast, the example access network 100 of FIG. 1 dynamically allocates bandwidth between video and other non-video services, such as Internet-based communication services. Based on the number of video streams currently being displayed at and/or by one or more devices communicatively coupled to the RG 130, two of which are designated at reference numerals 155 and 156, the example access network 100 adjusts the allocation of bandwidth between video services and other non-video services. In general, the amount of bandwidth reserved for video services depends on the number and types (e.g., HD vs. SD) of video streams currently being displayed. For example, if only two standard-definition (SD) video streams are currently being displayed, 6 Mbps of the subscriber loop's capacity could be reserved for video services. Likewise, if only one high-definition (HD) video stream is currently being displayed, 9 Mbps of the subscriber loop's capacity could be reserved for video services. The remaining capacity of the subscriber loop 150 can be made available to other non-video services. Example devices that may be communicatively coupled to the example RG 130 include, but are not limited to a set-top box (STB) 155 and/or a personal computer (PC) 156.

To determine the number of video streams currently being displayed at and/or by the devices 155 and 156, the example RG 130 of FIG. 1 includes a usage monitor 160. By tracking Internet group management protocol (IGMP) joins and IGMP leaves performed by the example devices 155 and 156, and monitoring the unicast traffic received from an Internet protocol (IP) address associated with a video server, the example usage monitor 160 of FIG. 1 determines the number of live and VoD streams that are currently be displayed at and/or by the devices 155 and 156. In some examples, the usage monitor 160 includes and/or implements an IGMP snooper. The number of currently active live and VoD streams can be used by the example usage monitor 160 to determine the data rate that must be currently reserved for and/or allocated to video services. The example usage monitor 160 of FIG. 1 sends the video usage data and/or information (i.e., the current number of active video streams and/or the data rate that must be reserved for the active video streams) to the example DSLAM 125 via the CPE DSL modem 132 and the subscriber line 150 using, for example, an overhead and/or management channel as defined by the ITU-T G.993.x family of recommendations. The DSLAM 125 subsequently forwards the video usage data and/or information to the example Ethernet service switch 120 via the VLAN stream associated with the customer premises 110.

To configure, implement and/or enforce an allocation of bandwidth between video and non-video services, the example DSLAM 125 of FIG. 1 includes a bandwidth manager 165, and the example Ethernet service switch 120 of FIG. 1 includes a bandwidth manager 170. As described below in connection with FIGS. 2 and 3, the example bandwidth managers 165 and 170 of FIG. 1 dynamically adjust, manage and/or control one or more traffic-shaping parameters to limit and/or allocate a particular amount of bandwidth to non-video services. In the illustrated example of FIG. 1, the bandwidth managers 165 and 170 adjust an egress rate and/or a length of a queue used to buffer data associated with non-video services. By adjusting the egress rate and/or the queue length, the maximum data rate at which non-video services can be transported via the subscriber line 150 may be dynamically controlled, which effectively dynamically adjusts the amount of bandwidth reserved for video services.

While an example access network 100 has been illustrated in FIG. 1, one or more of the interfaces, data structures, elements, processes and/or devices illustrated in FIG. 1 may be combined, divided, re-arranged, omitted, eliminated and/or implemented in any other way. Further, the example RG 130, the example CPE DSL modem 132, the example usage monitor 160, the example DSLAMs 125 and 126, the example bandwidth manager 165, the example Ethernet service switch 120, and/or the example bandwidth manager 170 of FIG. 1 may be implemented by hardware, software, firmware and/or any combination of hardware, software and/or firmware. Thus, for example, any of the example RG 130, the example CPE DSL modem 132, the example usage monitor 160, the example DSLAMs 125 and 126, the example bandwidth manager 165, the example Ethernet service switch 120, and/or the example bandwidth manager 170 may be implemented by one or more device(s), circuit(s), programmable processor(s), application specific integrated circuit(s) (ASIC(s)), programmable logic device(s) (PLD(s)) and/or field programmable logic device(s) (FPLD(s)), etc. Further still, an access network may include interfaces, data structures, elements, processes and/or devices instead of, or in addition to, those illustrated in FIG. 1 and/or may include more than one of any or all of the illustrated interfaces, data structures, elements, processes and/or devices.

Figure 2:
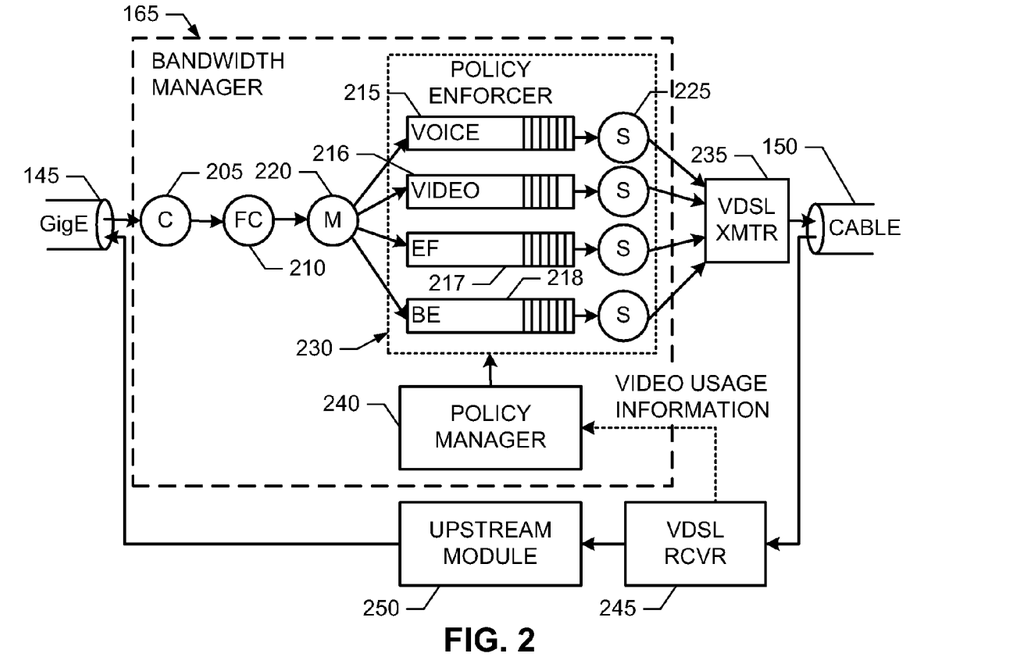
FIG. 2 illustrates an example manner of implementing a bandwidth manager for a DSLAM of the example access network of FIG. 1.

FIG. 2 illustrates an example manner of implementing the example bandwidth manager 165 of FIG. 1. The example bandwidth manager 165 of FIG. 2 processes the communication service data for a particular customer premises 110, 111. However, because the example DSLAM 125 handles communication service data for multiple customer premises 110, 111, the DSLAM 125 will implement an instance of the example bandwidth manager 165 for each of the customer premises 110 and 111 served by the DSLAM 125. In some examples, a classifier 205, a forwarding class identifier 210 and/or a marker 220 may process communication service data for multiple customer premises 110 and 111. Additionally or alternatively, a shaper 225 may shape the output of more than one queue 215-218.

To classify incoming packets, the example bandwidth manager 165 of FIG. 2 includes the example classifier (C) 205. The example classifier 205 of FIG. 2 classifies each incoming packet based on a priority bit (i.e., a p-bit) associated with the packet. To further classify incoming packets, the example bandwidth manager 165 of FIG. 2 includes the example forwarding class (FC) identifier 210. The example forwarding class identifier 210 of FIG. 2 associates each incoming packet with a forwarding class. To mark incoming packets for routing into a particular queue 215-218, the example bandwidth manager 165 of FIG. 2 includes the example marker (M) 220. Based on a packet's p-bit and forwarding class, the example marker 220 marks the packet with an identifier associated with one of the queues 215-218.

To buffer data, the example bandwidth manager 165 of FIG. 2 includes the example queues 215-218. The example queues 215-218 of FIG. 2 buffer packets for respective ones of communication services. For instance, the example queue 215 is used to hold data for voice services, the example queue 216 is used to hold data for video services, the example queue 217 is used to hold data needing forwarding on an expedited basis (EF), and the example queue 218 is used to hold data that may be forwarded on a best effort basis (BE). Outputs of the example shapers 225 are transported to the customer premises 110 via any type of CO VDSL transmitter 235 and the subscriber line 150.

To shape the output of the example queues 215-218, each of the queues 215-218 has an associated shaper (S), one of which is designated at reference numeral 225. The example shapers 225 of FIG. 2 control the output of their respective queue 215-218 such that one or more desired traffic statistics are satisfied. For example, the example shaper 225 may limit the egress rate of its associated queue 215 to be less than a threshold. When the egress rate of the queue 215-218 exceeds the threshold, the shaper 225 blocks the queue 215-218 from outputting more data. Up to the depth of the queue 215-218 blocked data will be retained. When the egress rate limit for a queue 215-218 exceeds the ingress rate for a sufficient length of time, data in the queue 215-218 may be discarded.

As illustrated in FIG. 2, the queues 215-218 and the shapers 225 collectively implement a bandwidth policy enforcer 230 for each of one or more communication services associated with the queues 215-218. By controlling the length of the queues 217 and 218 and the traffic pattern(s) enforced by their associated shapers 225, a limit on the data rate associated with non-video services can be enforced. By limiting the data rate associated with non-video services, a desired portion of the bandwidth of the subscriber line 150 is reserved for video services.

To control the bandwidth allocations enforced by the bandwidth policy enforcer 230, the example bandwidth manager 165 of FIG. 2 includes a policy manager 240. When video usage data and/or information is received from the customer premises 110 via the subscriber line 150 and any type of VDSL receiver 245, the example policy manager 240 configures the policy enforcer 230. Based on a maximum allowable data rate for non-video services, the example policy manager 240 configures a maximum allowable egress rate for the shapers 225 associated with the queues 215, 217 and/or 218. Additionally or alternatively, the policy manager 240 may configure lengths for the queues 217 and 218. In some examples, the video usage data and/or information represents a current number of active video streams at the customer premises 110, and the policy manager 240 computes the maximum allowable data rate for non-video services. Additionally or alternatively, the video usage data and/or information represents the maximum allowable data rate for non-video services, and the policy manager 240 makes a corresponding configuration of the policy enforcer 230.

User data received via the VDSL receiver 245 is processed by an upstream module 250 prior to being transported to the Ethernet service switch 120 via the example GigE communication paths 145. In some examples, the example upstream module 250 of FIG. 2 is implemented similarly to the example bandwidth manager 165.

While an example manner of implementing the example bandwidth manager 165 of FIG. 1 has been illustrated in FIG. 2, one or more of the elements, processes and/or devices illustrated in FIG. 2 may be combined, divided, re-arranged, omitted, eliminated and/or implemented in any other way. Further, the example classifier 205, the example forwarding class identifier 210, the example marker 220, the example queues 215-218, the example shapers 225, the example policy enforcer 230, the example VDSL transmitter 235, the example policy manager 240, the example VDSL receiver 245, the example upstream module 250 and/or, more generally, the example bandwidth manager 165 of FIG. 2 may be implemented by hardware, software, firmware and/or any combination of hardware, software and/or firmware. Thus, for example, any or all of the example classifier 205, the example forwarding class identifier 210, the example marker 220, the example queues 215-218, the example shapers 225, the example policy enforcer 230, the example VDSL transmitter 235, the example policy manager 240, the example VDSL receiver 245, the example upstream module 250 and/or, more generally, the example bandwidth manager 165 may be implemented by one or more device(s), circuit(s), programmable processor(s), ASIC(s), PLD(s) and/or FPLD(s), etc. Further still, a bandwidth manager for a DSLAM may include one or more elements, processes and/or devices in addition to, or instead of, those illustrated in FIG. 2, and/or may include more than one of any or all of the illustrated elements, processes and devices.

Figure 3:
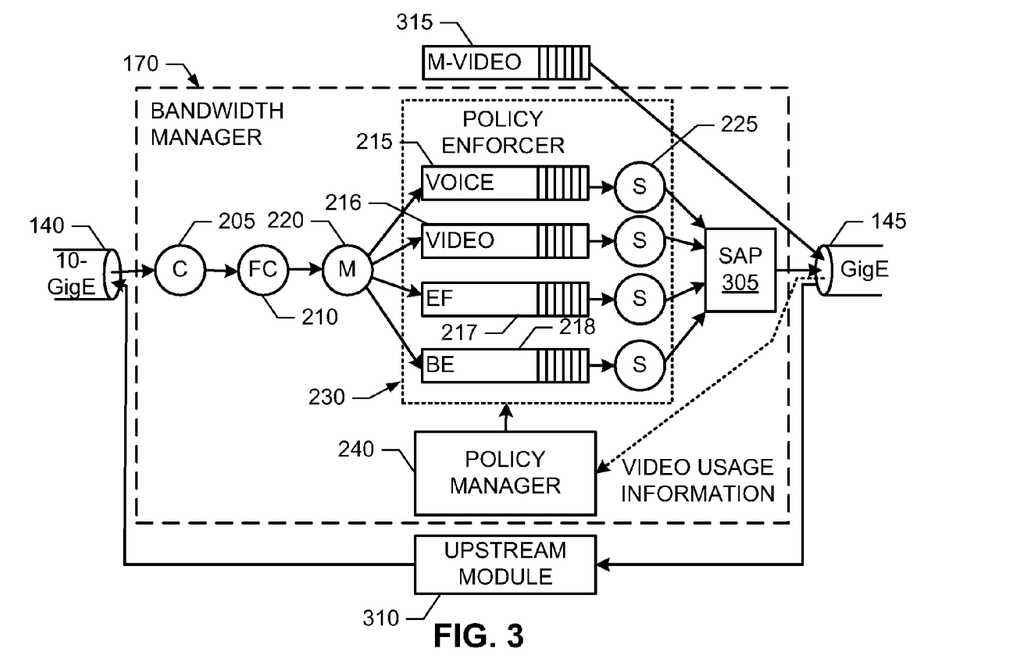
FIG. 3 illustrates an example manner of implementing a bandwidth manager for an Ethernet service switch of the example access network of FIG. 1.

FIG. 3 illustrates an example manner of implementing the bandwidth manager 170 of FIG. 1. Because elements of the example bandwidth manager 170 of FIG. 3 are identical to those discussed above in connection with FIG. 3, the descriptions of the identical elements are not repeated here. Instead, identical elements are designated with identical reference numerals in FIGS. 2 and 3, and the interested reader is referred back to the descriptions presented above in connection with FIG. 3 for a complete description of those like numbered elements. Like the example bandwidth manager 165 of FIG. 2, the example bandwidth manager 170 of FIG. 3 processes the communication service data for a particular customer premises 110, 111. However, because the example Ethernet service switch 120 handles communication service data for multiple customer premises 110, 111, the Ethernet service switch 120 will implement an instance of the example bandwidth manager 170 for each of the customer premises 110 and 111 served by the Ethernet service switch 120. In some examples, a classifier 205, a forwarding class identifier 210 and/or a marker 220 may process communication service data for multiple customer premises 110 and 111. Additionally or alternatively, a shaper 225 may shape the output of more than one queue 215-218.

In the illustrated example of FIG. 3, outputs of the example shapers 225 are transported to the SAI 115 via any type of service access point (SAP) 305 and the GigE communication paths 145. Among other functions, the example SAP 305 of FIG. 3 forms a VLAN stream for the customer premises 110, 111 associated with the example bandwidth manager 170.

User data received via the GigE communication paths 145 may be processed by an upstream module 310 prior to being transported to the Intermediate Office 135 via the example 10-GigE communication paths 140. In some examples, the example upstream module 310 of FIG. 3 is implemented similarly to the example bandwidth manager 170.

As illustrated in FIG. 3, multicast video data from a multicast video queue 315 is also transported to the DSLAM 125 via the GigE communication paths 145. Such multicast video data may represent one or more live and/or non-VoD video programs.

While an example manner of implementing the example bandwidth manager 170 of FIG. 1 has been illustrated in FIG. 3, one or more of the elements, processes and/or devices illustrated in FIG. 3 may be combined, divided, re-arranged, omitted, eliminated and/or implemented in any other way. Further, the example classifier 205, the example forwarding class identifier 210, the example marker 220, the example queues 215-218 and 315, the example shapers 225, the example policy enforcer 230, the example SAP 305, the example policy manager 240, the example upstream module 310 and/or, more generally, the example bandwidth manager 170 of FIG. 3 may be implemented by hardware, software, firmware and/or any combination of hardware, software and/or firmware. Thus, for example, any or all of the example classifier 205, the example forwarding class identifier 210, the example marker 220, the example queues 215-218 and 315, the example shapers 225, the example policy enforcer 230, the example SAP 305, the example policy manager 240, the example upstream module 310 and/or, more generally, the example bandwidth manager 170 may be implemented by one or more device(s), circuit(s), programmable processor(s), ASIC(s), PLD(s) and/or FPLD(s), etc. Further still, a bandwidth manager for an Ethernet service switch may include one or more elements, processes and/or devices in addition to, or instead of, those illustrated in FIG. 3, and/or may include more than one of any or all of the illustrated elements, processes and devices.

Figure 4:
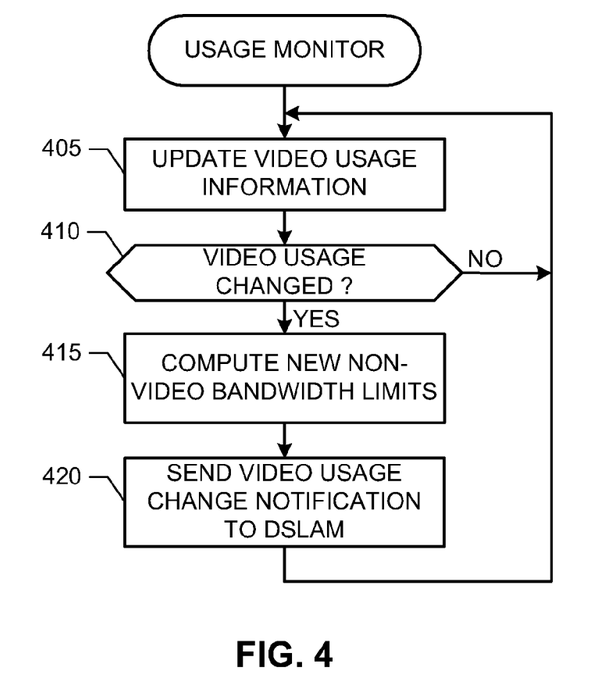
FIG. 4 is a flowchart representative of an example process that may be carried out by, for example, a processor to implement a usage monitor for the example access network of FIG. 1.
Figure 5:
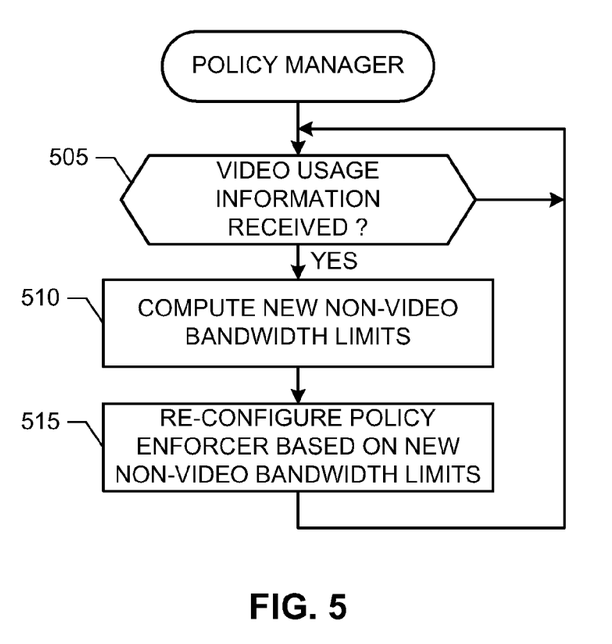
FIG. 5 is a flowchart representative of an example process that may be carried out by, for example, a processor to implement a policy manager for the example access network of FIG. 1.

FIG. 4 is a flowchart representative of an example process that may be carried out to implement the example usage monitor 160 and/or, more generally, the example RG 130 of FIG. 1. FIG. 5 is a flowchart representative of an example process that may be carried out to implement the example policy manager 240 for either or both of the example bandwidth managers 165 and 170 of FIGS. 1 and/or 2. The example processes of FIGS. 4 and 5 may be carried out by a processor, a controller and/or any other suitable processing device. For example, the example processes of FIGS. 4 and 5 may be embodied in coded instructions stored on any tangible computer-readable medium such as a flash memory, a compact disc (CD), a digital versatile disc (DVD), a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-accessible instructions or data structures, and which can be accessed by a processor, a general-purpose or special-purpose computer, or other machine with a processor (e.g., the example processor platform P100 discussed below in connection with FIG. 6). Combinations of the above are also included within the scope of computer-readable media. Machine-accessible instructions comprise, for example, instructions and/or data that cause a processor, a general-purpose computer, special-purpose computer, or a special-purpose processing machine to implement one or more particular processes. Alternatively, some or all of the example processes of FIGS. 4 and 5 may be implemented using any combination(s) of ASIC(s), PLD(s), FPLD(s), discrete logic, hardware, firmware, etc. Also, some or all of the example processes of FIGS. 4 and 5 may instead be implemented manually or as any combination of any of the foregoing techniques, for example, any combination of firmware, software, discrete logic and/or hardware. Further, many other methods of implementing the example operations of FIGS. 4 and 5 may be employed. For example, the order of execution of the blocks may be changed, and/or one or more of the blocks described may be changed, eliminated, sub-divided, or combined. Additionally, any or all of the example processes of FIGS. 4 and 5 may be carried out sequentially and/or carried out in parallel by, for example, separate processing threads, processors, devices, discrete logic, circuits, etc.

The example process of FIG. 4 begins with the example usage monitor 160 of FIG. 1 updating one or more parameters representative of the number of video programs currently being display at and/or by the example devices 155 and 156 (block 405). The usage monitor 160 updates the parameters by tracking IGMP joins and IGMP leaves performed by the example devices 155 and 156, and/or by monitoring unicast traffic received from an IP address associated with a video server. If the number of current video programs has not changed (block 410), control returns to block 405 to continue monitor video usage.

If the number of current video programs has changed (block 410), the usage monitor 160 computes a new bandwidth limit for non-video data (block 415) and sends the current number of video programs and/or the computed bandwidth to the example DSLAM 125 via the CPE VDSL modem 132 and the subscriber line 150 (block 420). Control then exits from the example process of FIG. 4. In some examples, the usage monitor 160 does not carry out block 415 and only sends the current number of video programs to the DSLAM 125.

The example process of FIG. 5 begins with the policy manager 240 of FIGS. 2 and/or 3 waiting to receive updated video usage data from an RG 130 (block 505). When updated video usage data is received (block 505), the policy manager 240 computes a new bandwidth limit for non-video data based on the number of currently active video sessions reported by the RG 130 (block 510). If the received video usage data includes a new bandwidth limit for non-video data, block 510 may be skipped. The policy manager 240 configures the example policy enforcer 230 associated with the RG 130 based on the new bandwidth limit for non-video data (block 515). Control then returns to block 505 to wait for additional updated video usage data.

Figure 6:
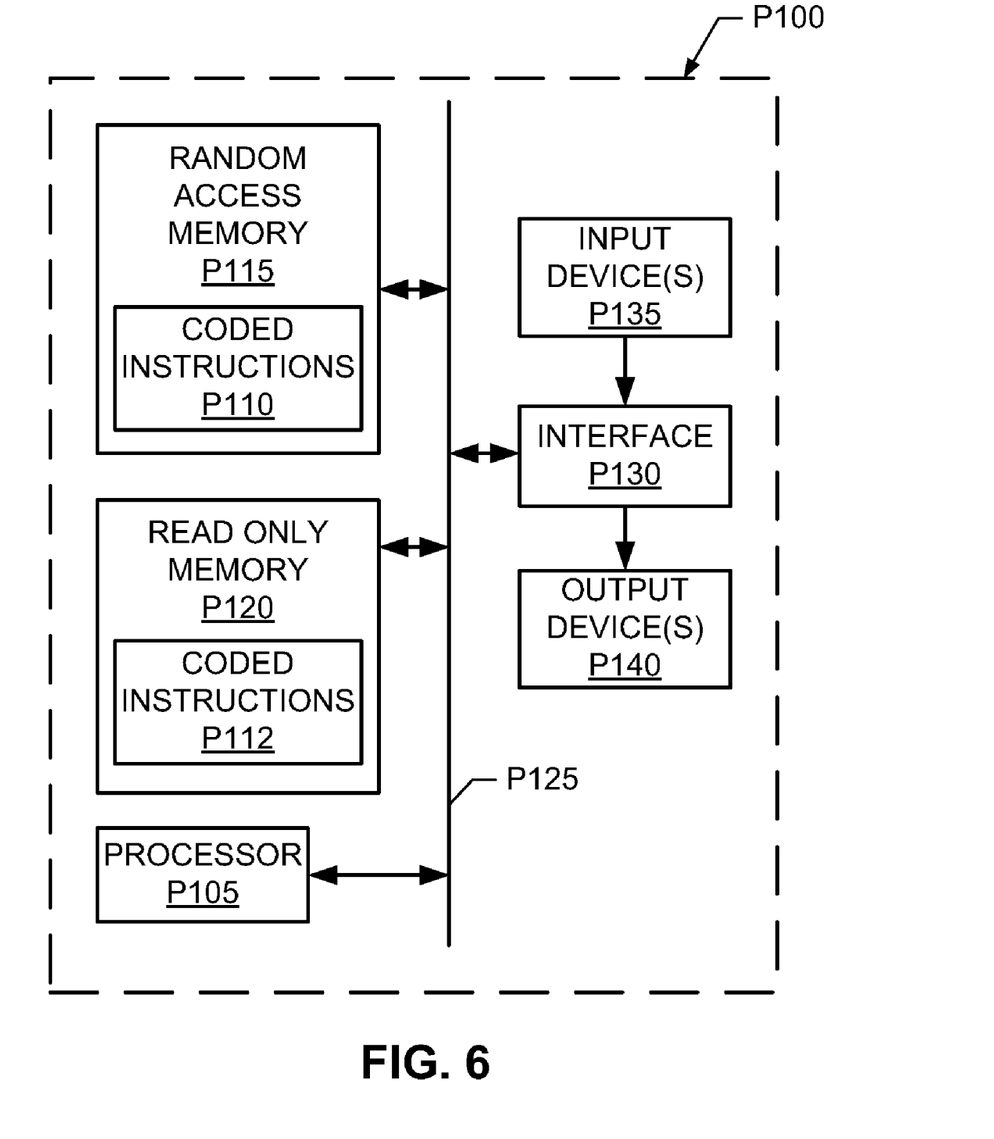
FIG. 6 is a schematic illustration of an example processor platform that may be used and/or programmed to execute the example processes of FIGS. 4 and/or 5 to implement any or all of the example bandwidth allocation methods and apparatus described herein.

FIG. 6 is a schematic diagram of an example processor platform P100 that may be used and/or programmed to implement any or all of the example RG 130, the example CPE DSL modem 132, the example usage monitor 160, the example DSLAMs 125 and 126, the example bandwidth manager 165, the example Ethernet service switch 120, the example bandwidth manager 170, the policy enforcer 230, and/or the example policy manager 240 of FIGS. 1-3. For example, the processor platform P100 can be implemented by one or more general-purpose processors, processor cores, microcontrollers, etc.

The processor platform P100 of the example of FIG. 6 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 4 and/or 5 to implement the example methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown). The example memory P115 may be used to implement any or all of the example queues 215-218 and 315 of FIGS. 2 and/or 3.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The example input devices P135 and the example output devices P140 may be used to implement any or all of the example CPE VDSL modem 132, the example VDSL transmitter 235, the example VDSL receiver 245 of FIGS. 1 and/or 2.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:
1. A system comprising:
    a customer-premises device;
    a digital subscriber line access multiplexer (DSLAM) to transmit to the customer-premises device a signal having a non-video portion and a video portion;

a usage monitor at the customer-premises device to monitor a usage of the video portion and to send a parameter representative of the usage of the video portion to the DSLAM; and a policy manager at the DSLAM to adjust at the DSLAM a bandwidth allocation between the video portion and the non-video portion based on the parameter.

2. A system as defined in claim 1, further comprising an Ethernet service switch, wherein the DSLAM is communicatively coupled between the Ethernet service switch and the customer-premises device, wherein the usage monitor is to send the parameter to the Ethernet Service switch, and wherein the Ethernet service switch is to adjust at the Ethernet service switch a second bandwidth allocation between the video portion and the non-video portion based on the parameter.

3. A system as defined in claim 1, wherein the customer-premises device comprises:
a very high-speed digital subscriber line modem to receive the signal and to separate the non-video portion from the video portion; and
the usage monitor.

4. A system as defined in claim 1, wherein the DSLAM comprises:
a policy enforcer to limit usage of the non-video portion based on the bandwidth allocation;
a very high-speed digital subscriber line modem to transmit the signal to the customer-premises device; and
the policy manager.

5. A system as defined in claim 1, wherein the policy enforcer comprises a queue, and wherein the policy manager is to adjust the bandwidth allocation by configuring at least one of a size or an egress rate for the queue.

6. A system as defined in claim 1, one or more set-top boxes communicatively coupled to the customer-premises device, wherein the parameter comprises a number of video streams being viewed via the one or more set-top boxes.

7. A system as defined in claim 1, wherein the parameter comprises a maximum allowable data rate for the non-video portion.

8. A system as defined in claim 1, wherein the usage monitor comprises an Internet group management protocol snooper.

9. A system as defined in claim 1, wherein the customer-premises device comprises a residential gateway.

10. A system as defined in claim 1, wherein the usage monitor is to monitor a usage of the video portion by measuring at least one of a bandwidth, a data rate, or a number of bytes corresponding to the video portion.

11. A customer-premises apparatus comprising:
a digital subscriber line (DSL) modem to receive a signal having a non-video portion and a video portion; and
a usage monitor to determine a parameter representative of usage of the video portion and to provide the parameter to a DSL access multiplexer (DSLAM), wherein the DSLAM is to apply a bandwidth limit to the non-video portion of the signal at the DSLAM based on the parameter.

12. A customer-premises apparatus as defined in claim 11, wherein the usage monitor provides the parameter to the DSLAM by providing the parameter to the DSL modem, wherein the DSL modem is to transmit the parameter to the DSLAM.

13. A customer-premises apparatus as defined in claim 11, wherein the usage monitor comprises an Internet group management protocol snooper.

14. A customer-premises apparatus as defined in claim 11, wherein the parameter comprises a number of video streams being viewed via one or more set-top boxes communicatively coupled to the customer-premises apparatus.

15. A customer-premises apparatus as defined in claim 11, wherein the parameter comprises a maximum allowable data rate for the non-video portion.

16. A method comprising:
receiving a digital subscriber line (DSL) signal having a non-video portion and a video portion;
determining a parameter representative of usage of the video portion; and
sending the parameter to a DSL access multiplexer (DSLAM), wherein the DSLAM is to adjust a bandwidth allocation between the video portion and the non-video portion of the signal at the DSLAM based on the parameter.

17. A method as defined in claim 16, wherein the parameter is determined based on at least one of an Internet group management protocol (IGMP) join, an IGMP leave, or an amount of unicast traffic associated with a video server.

18. A method as defined in claim 16, wherein the parameter comprises a number of video streams being viewed via one or more set top-boxes associated with the DSL signal.

19. A method as defined in claim 16, wherein the parameter comprises a maximum allowable data rate for the non-video portion.

20. A computer-readable storage medium storing machine readable instructions that, when executed, cause a machine to at least:
receive at a customer-premises device a digital subscriber line (DSL) signal having a non-video portion and a video portion; determine at the customer-premises device a parameter representative of usage of the video portion; and
send the parameter to a DSL access multiplexer (DSLAM), wherein the DSLAM is to adjust a bandwidth allocation between the video portion and the non-video portion of the signal at the DSLAM based on the parameter.

21. A computer-readable storage medium as defined in claim 20, wherein the machine readable instructions, when executed, cause the machine to determine the parameter based on at least one of an Internet group management protocol (IGMP) join, an IGMP leave, or an amount of unicast traffic associated with a video server.

22. A computer-readable storage medium as defined in claim 20, wherein the parameter comprises a number of video streams being viewed via one or more set top-boxes associated with the DSL signal.

23. A computer-readable storage medium as defined in claim 20, wherein the parameter comprises a maximum allowable data rate for the non-video portion.

* * * * *